Aug. 25, 1931.   P. S. BAUER   1,820,212
ELECTRIC METER
Filed Nov. 7, 1929
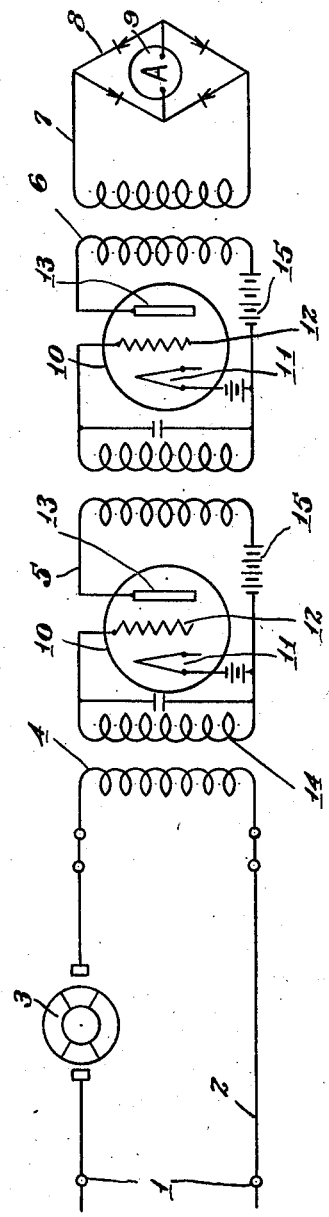
Inventor
Paul S. Bauer
by David Rines
Attorney Patented Aug. 25, 1931

1,820,212

UNITED STATES PATENT OFFICE

PAUL SHERMAN BAUER, OF CAMBRIDGE, MASSACHUSETTS

ELECTRIC METER

Application filed November 7, 1929. Serial No. 405,488.

The present invention relates to electric measurements, and particularly to measurement of currents or voltages. More specifically, the invention is related to the precise measurement of exceedingly minute, direct currents or voltages.

The precise measurement of very small direct currents and voltages has always presented a problem. Among other things, the measuring galvanometer is not mechanically stable, with the result that outside vibrations, no matter how slight, produce erratic deflections on the scale. When large currents or voltages are measured, of course, this mechanical instability is of minor importance, but in the measurement of small quantities, the resulting errors are of the same order of magnitude as the quantities to be measured. It has heretofore been proposed to eliminate these difficulties by the use of specially-designed, mechanical constructions, but these are not practicable, at least in connection with ordinary portable instruments, and can only be uesd, if at all, in the laboratory.

Secondly, extremely sensitive galvanometers are not adapted to the rapid reading of rapidly changing, steady, electrical quantities. In order to measure a current of $10^{-12}$ amperes, for example, one must wait a relatively long period of time until the indicator of the instrument becomes settled, and this is true even when the instrument is critically damped. The present invention is more particularly concerned with the solution of this problem.

The invention will be explained in connection with the accompanying drawing, the single figure of which is a diagram of circuits and apparatus constructed and arranged according to a preferred embodiment of the invention.

The invention is illustrated, in perhaps its simplest form, as applied to the measurement of a source of direct voltage 1, causing a current to flow in the circuit 2. As ammeters operate upon the same principle as voltmeters, the measurement of current involving merely the measurement of the voltage drop across a known impedance, it will be understood that the invention is equally applicable to the measurement of voltages and currents. Both currents and voltages will be hereinafter referred to under the generic term "electrical quantity". The source 1, for concreteness, typifies any two points between which it is desired to determine the difference of electric potential; and the circuit 2 any circuit in which flows a current that it is desired to measure.

The direct voltage or current being assumed small, the first step, according to the new method, is to convert it into an alternating or interrupted form, so that it may be amplified. This may conveniently be effected by means of an interrupter 3. The circuit 2 is coupled, as by means of an input transformer 4, to an alternating-current amplifier 5 resonant to the frequency of the interruptions. Energy from the circuit 2 may thus be transferred into the circuit of the amplifier 5 and amplified thereby to any convenient value. For reasons that need not be introduced here, it would ordinarily be impracticable to measure the amplified current or voltage. The amplified energy is, therefore, transferred, by means of an output transformer 6, to a circuit 7, having a rectifier 8, such as a copper-oxide full-wave rectifier. The rectified current or voltage in the circuit 7 may then be measured by any suitable instruments, as a direct-current ammeter 9, though the original current or voltage in the circuit 2 may have been too weak to make any accurate impress upon the instrument. Thus, 50 micro-volts across 10,000 ohms at the source 1, may produce 1 milliampere of output rectified current.

The amplifier may be of the ordinary audion or vacuum-tube type, shown at 10, comprising a filament 11, a grid 12 and a plate 13. The secondary winding 14 of the input transformer 4 is connected in the external input circuit of the audion, between the filament 11 and the grid 12. The amplified energy traverses the amplifier output circuit, between the filament 11 and the plate 13, and comprising a battery or other source of plate voltage 15. As many additional stages of amplification as desired may be used, five, for example, two stages being illustrated. The amplifier should preferably be resonant and of low frequency.

This invention eliminates the difficulties heretofore encountered in connection with outside vibrations, and the instrument is not subject to the disadvantages beforementioned connected with the rapid reading of rapidly changing, steady, electrical quantities. The frequency of the interrupter being low, the influence of mechanical vibrations tending to reduce the so-called microphonic tube noise is minimized. Spurious electrical effects produced at the commutator, of periods which are not the period of the interrupter, are obviated, for the resonant amplifier will pass only the frequency corresponding to the fundamental current or voltage. By having the resonant period of the amplifier low, the mutual impedance between the stages, which tends to cause self-oscillation of the amplifier, is reduced, thereby increasing the electrical stability of the amplifier. Furthermore, if the frequency of the interrupter is below the frequency of the alternating current used in the power mains, the danger of electrical pick-ups from outside sources is removed.

To calibrate the device, the reading of the instrument 9 may be observed when known, standard currents flow in the circuit 2, or when the source of voltage 1 is replaced by known, standard voltage drops.

The instrument may be employed as an ordinary direct-current galvanometer, and also in special applications. Thus, it may be used as an indicator in an ordinary potentiometer circuit to denote the equivalence of voltage between the source and, say, a fraction of a standard cell.

Modifications will occur to persons skilled in the art, and all such are considered to fall within the spirit and scope of the invention, as defined in the appended claims.

What is claimed is:

1. A method of measuring a direct-current electrical quantity that comprises converting the direct-current electrical quantity into an interrupted-current electrical quantity, amplifying the interrupted-current electrical quantity, excluding all but the fundamental frequency of the interrupted current electrical quantity, and measuring the amplified-current electrical quantity.

2. A method of measuring a direct-current electrical quantity that comprises converting the direct-current electrical quantity into an interrupted-current electrical quantity, amplifying the interrupted-current electrical quantity, excluding all but the fundamental frequency of the interrupter-current electrical quantity, rectifying the amplified-current electrical quantity, and measuring the rectified electrical quantity.

3. An electric meter comprising a circuit in which there is a direct-current electrical quantity to be measured, means for converting the direct-current electrical quantity into an interrupted-current electrical quantity, an amplifier for amplifying the interrupted-current electrical quantity, a transformer coupling the converting means with the amplifier, and means for measuring the amplified electrical quantity.

4. An electric meter comprising a circuit in which there is a direct-current electrical quantity to be measured, means for converting the direct-current electrical quantity into an interrupted-current electrical quantity, a resonant amplifier for amplifying the interrupted-current electrical quantity, means for rectifying the amplified-current electrical quantity, and means for measuring the rectified-current electrical quantity.

5. An electric meter comprising a circuit in which there is a direct-current electrical quantity to be measured, means for periodically interrupting the direct-current electrical quantity, an amplifying circuit coupled to the first-named circuit into which energy is transferred from the first-named circuit, a circuit for receiving the amplified energy from the amplifying circuit, means for rectifying the electrical quantity in the receiving circuit, and means for measuring the rectified electrical quantity.

6. An electric meter comprising a circuit in which there is a direct-current electrical quantity to be measured, means for periodically interrupting the direct-current electrical quantity, a resonant amplifying circuit coupled to the first-named circuit into which energy is transferred from the first-named circuit, a circuit for receiving the amplified energy from the amplifying circuit, means for rectifying the electrical quantity in the receiving circuit, and means for measuring the rectified electrical quantity.

In testimony whereof, I have hereunto subscribed my name.

PAUL SHERMAN BAUER.